United States Patent
Winkler et al.

(10) Patent No.: US 7,189,053 B2
(45) Date of Patent: Mar. 13, 2007

(54) FAN MOUNTING MEANS AND METHOD OF MAKING THE SAME

(75) Inventors: Wolfgang Arno Winkler, St. Georgen (DE); Peter Metzger, Vs-Villingen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 247 days.

(21) Appl. No.: 10/884,697

(22) Filed: Jul. 2, 2004

(65) Prior Publication Data

US 2005/0069407 A1    Mar. 31, 2005

(30) Foreign Application Priority Data

Jul. 15, 2003   (DE) ................. 103 33 404

(51) Int. Cl.
*F04D 29/52*   (2006.01)
*F04D 29/66*   (2006.01)

(52) U.S. Cl. ............ 415/108; 415/119; 415/213.1

(58) Field of Classification Search ......... 415/119, 415/213.1, 108; 29/889.3, 889.2
See application file for complete search history.

(56) References Cited

U.S. PATENT DOCUMENTS

| | | | | |
|---|---|---|---|---|
| 3,317,124 A | * | 5/1967 | Morrill | 417/363 |
| 3,584,469 A | * | 6/1971 | Butts | 62/295 |
| 4,171,190 A | * | 10/1979 | Hudson | 417/350 |
| 4,568,243 A | | 2/1986 | Schubert | 415/213 |
| 6,050,890 A | | 4/2000 | Bayer | 454/120 |
| 6,507,135 B1 | | 1/2003 | Winkler | 310/911 |

FOREIGN PATENT DOCUMENTS

| | | |
|---|---|---|
| DE | 32 37 017 A1 | 4/1983 |
| DE | 196 43 760 | 12/1997 |
| WO | 00-13294 | 3/2000 |

* cited by examiner

Primary Examiner—Ninh H. Nguyen
(74) Attorney, Agent, or Firm—Milton Oliver; Ware Fressola Van Der Sluys & Adolphson LLP (57) ABSTRACT

A fan arrangement comprises a fan (10) having a fan housing (30) within which is arranged a blower wheel (18) which, in operation, moves air from an intake side of the fan (10) to a delivery side. Arranged radially outside the fan housing (30) is a surrounding mounting frame (34) that serves to support the fan housing (30). A membrane (32), made of an elastic material, elastically connects the fan housing (30) and mounting frame (34) to one another and is formed with through holes or apertures (33) that, in the event of a closure of the output or delivery side of the fan arrangement (40), enable a return flow, from the delivery side to the intake side of the fan arrangement (40), of air moved by the blower wheel (18).

57 Claims, 9 Drawing Sheets

FAN MOUNTING MEANS AND METHOD OF MAKING THE SAME

FIELD OF THE INVENTION

The present invention relates generally to an improved vibration-damping fan arrangement, and to a method of making the fan arrangement.

BACKGROUND

In numerous applications, for example ventilation of a vehicle seat or of equipment units, the vibrations produced by a fan are perceived as obtrusive. Such vibrations result from the normal operation of the fan and from changes in load and rotation speed. These vibrations tend to be transferred from the fan to the entire apparatus in which the fan is located.

DE 196 43 760 C1 and corresponding U.S. Pat. No. 6,050,890, BAYER+/DAIMLER/CHRYSLER disclose a fan arrangement in which a fan is suspended within flexible belts. This solution has the disadvantage that the belts are complex and laborious to manufacture, and to thread/assemble, after their manufacture.

SUMMARY OF THE INVENTION

It is therefore the object of the invention to provide a novel fan arrangement and a method of manufacturing the same.

According to the invention, this object is achieved by arranging a fan housing radially within a surrounding mounting frame, and interconnecting the housing and frame by an elastomeric membrane formed with apertures. As a result of the membrane, the vibrations produced by the fan are effectively decoupled from the mounting frame; and a reverse flow of air from the delivery side to the intake side is possible if the fan arrangement is closed off on its delivery side.

Another advantageous feature of the invention is the method of making the membrane, namely by placing a mold radially between the fan housing and mounting frame, and injection-molding the elastomeric interconnecting membrane. With such a method, a membrane can be quickly, reliably, and economically manufactured from an elastomeric material. It is also advantageous to make the fan housing and mounting frame from a hard plastic by injection molding.

Further details and advantageous refinements of the invention are evident from the exemplary embodiments, in no way to be understood as limitations of the invention, that are described below and depicted in the drawings.

DETAILED DESCRIPTION

Figure 1:
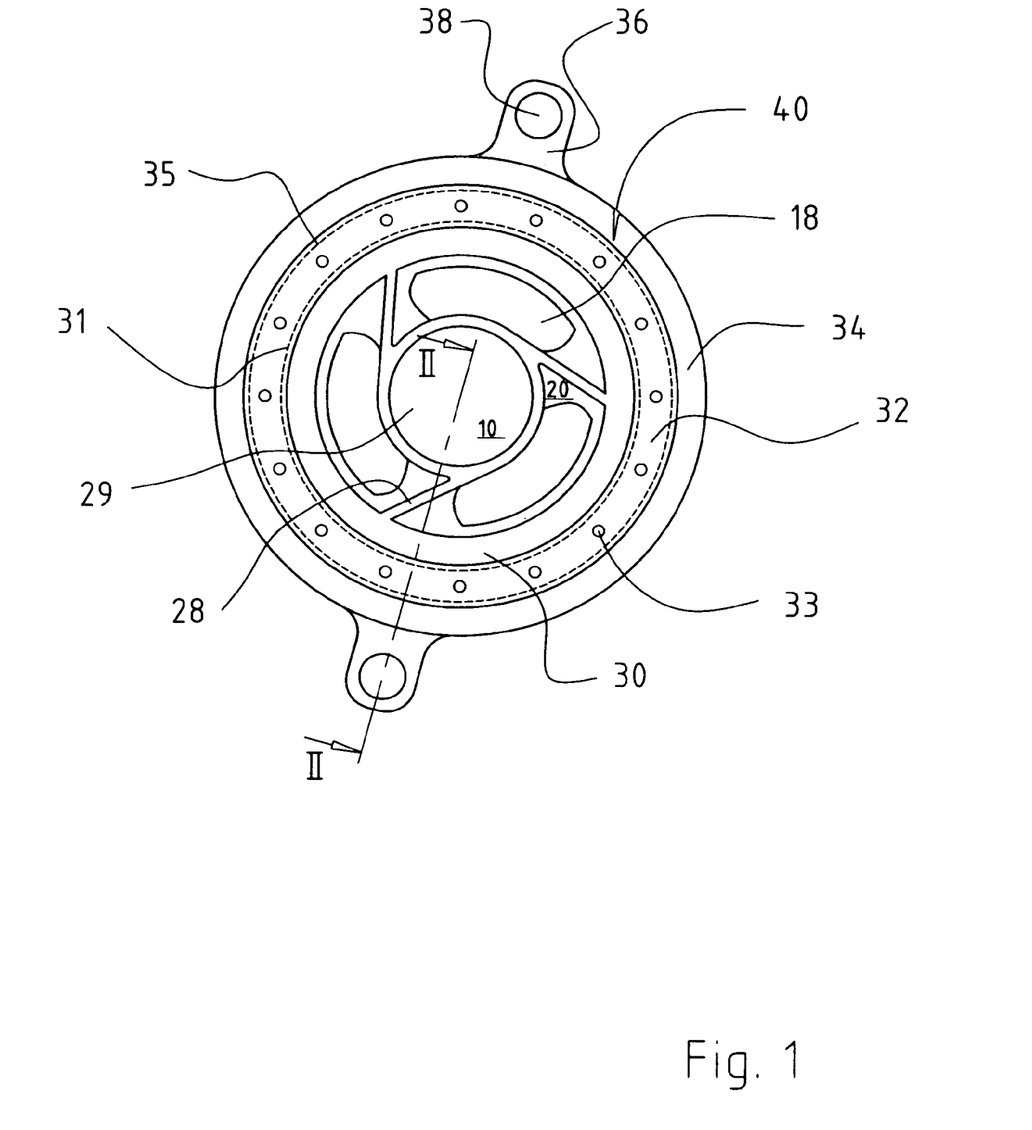
FIG. 1 is a plan view of a first exemplary embodiment of a fan arrangement according to the present invention, viewed in the direction of arrow I of FIG. 2.
Figure 2:
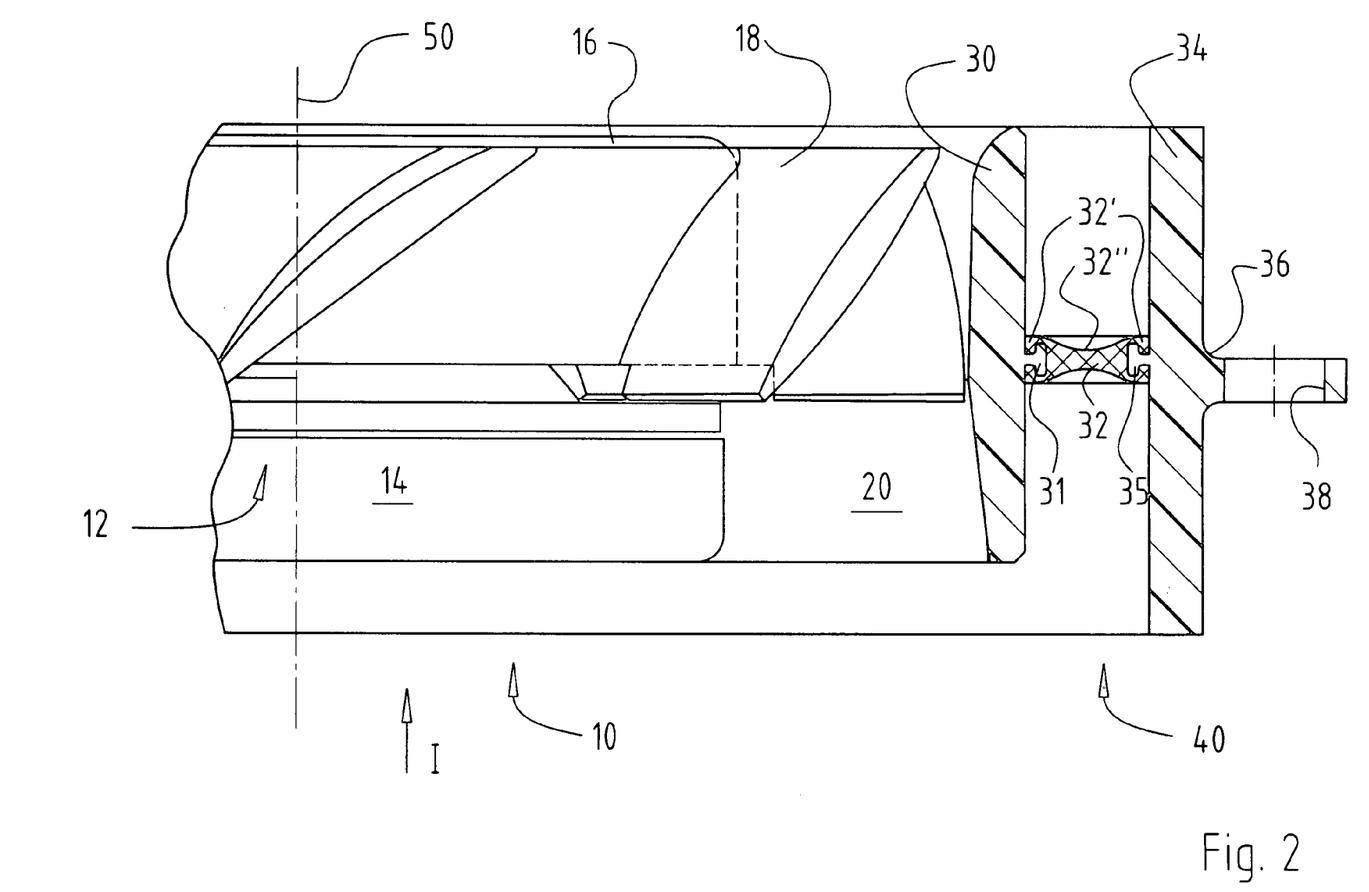
FIG. 2 is an enlarged sectioned depiction viewed along line II—II of FIG. 1.

FIG. 1 is a plan view of a first exemplary embodiment of a fan arrangement 40 according to the present invention having a fan 10, viewed in a direction indicated by arrow I of FIG. 2.

FIG. 2 is a side view of fan arrangement 40, viewed in section along line II—II of FIG. 1.

Fan 10 has an electric motor 12 comprising a stator arrangement 14 and a rotor 16, also fan blades 18, struts 28, a motor retention flange 29 (see FIG. 3), and a fan housing 30 comprising a lateral projection 31. The rotation axis of the fan is labeled 50 in FIG. 2.

Fan arrangement 40 has a membrane or diaphragm 32 comprising a plurality of apertures (through holes) 33, as well as a mounting frame 34 comprising a projection 35, a mounting frame holder 36, and a mounting opening 38.

Stator 14 is connected via struts 28 to fan housing 30, and drives rotor 16. Motion is thereby imparted to fan blades 18, and an air stream flows through region 20 between fan housing 30 and stator 14. An axial fan 12 is depicted, but the invention is similarly suitable, for example, for diagonal or centrifugal fans.

Fan housing 30 is connected via the circumferential annular membrane 32 to mounting frame 34, which in this exemplary embodiment comprises two mounting frame holders 36. Mounting openings 38 in mounting frame holders 36 serve for the mounting of mounting frame 34 and thus also of fan 10, for example by means of screws (not shown).

Membrane 32 thus connects fan 10 to mounting frame 34. For reliable connection, it encompasses both a projection 31 on fan housing 30 and a projection 35 on mounting frame 34. Projections 31, 35 can also be dovetail-shaped. In this exemplary embodiment, projections 31, 35 extend around the entire circumference of the fan, i.e. 360°. Fan housing 30 and mounting frame 34 are thus connected, in elastically resilient fashion, to one another over the entire or substantially the entire circumference, both on the fan housing side and on the mounting frame side.

Fan housing 30 and mounting frame 34, as well as projections 31, 35 formed integrally with them in this exemplary embodiment, are preferably manufactured from plastic or metal; and membrane 32 is preferably made of an elastomer.

Mode of Operation

Fan housing 30, and thus also fan 10, are retained both axially and radially by membrane 32 in the desired position relative to mounting frame 34, and thus constitute fan arrangement 40.

The connection is not rigid, but rather elastic and capable of vibrating or oscillating. Whereas rigid connections would transfer vibrations of fan 10 to the mounting frame largely undamped, membrane 32, being made of an elastomer, results in a desirably greater damping in terms of the transfer of vibrations from fan 10 to mounting frame 34.

A membrane 32 is capable of vibrating because it is relatively thin. As is evident from FIG. 2, the membrane has in edge regions 32', at which it is mounted on fan housing 30 and mounting frame 34, a thickness suitable for reliable connecting. At center 32", on the other hand, it is thin, so that fan 10 can move with respect to mounting frame 34.

The damping resulting from membrane 32 depends on the frequency to be transferred and on the membrane properties, i.e. in particular the material and shape of the membrane.

Each fan 10 produces vibrations in individually characteristic frequency ranges.

It is therefore advantageous to influence the membrane properties in such a way that, especially in the characteristic frequency ranges, membrane 32 exhibits good damping and thus also good decoupling. From the modification possibilities below, an optimum for the respective fan type is ascertained empirically.

A suitable plastic, in particular an elastomer whose hardness can be varied, is preferably used as the material from which the membrane is manufactured. One measure of hardness is the so-called Shore hardness. A combination of different materials is also possible.

In addition, in order to influence the membrane properties, the basic shape of the membrane is adapted, openings are configured in the membrane, and the thickness of the membrane is varied. Further exemplary embodiments, in some cases also representing combinations of these possible variations are presented below.

Figure 3:
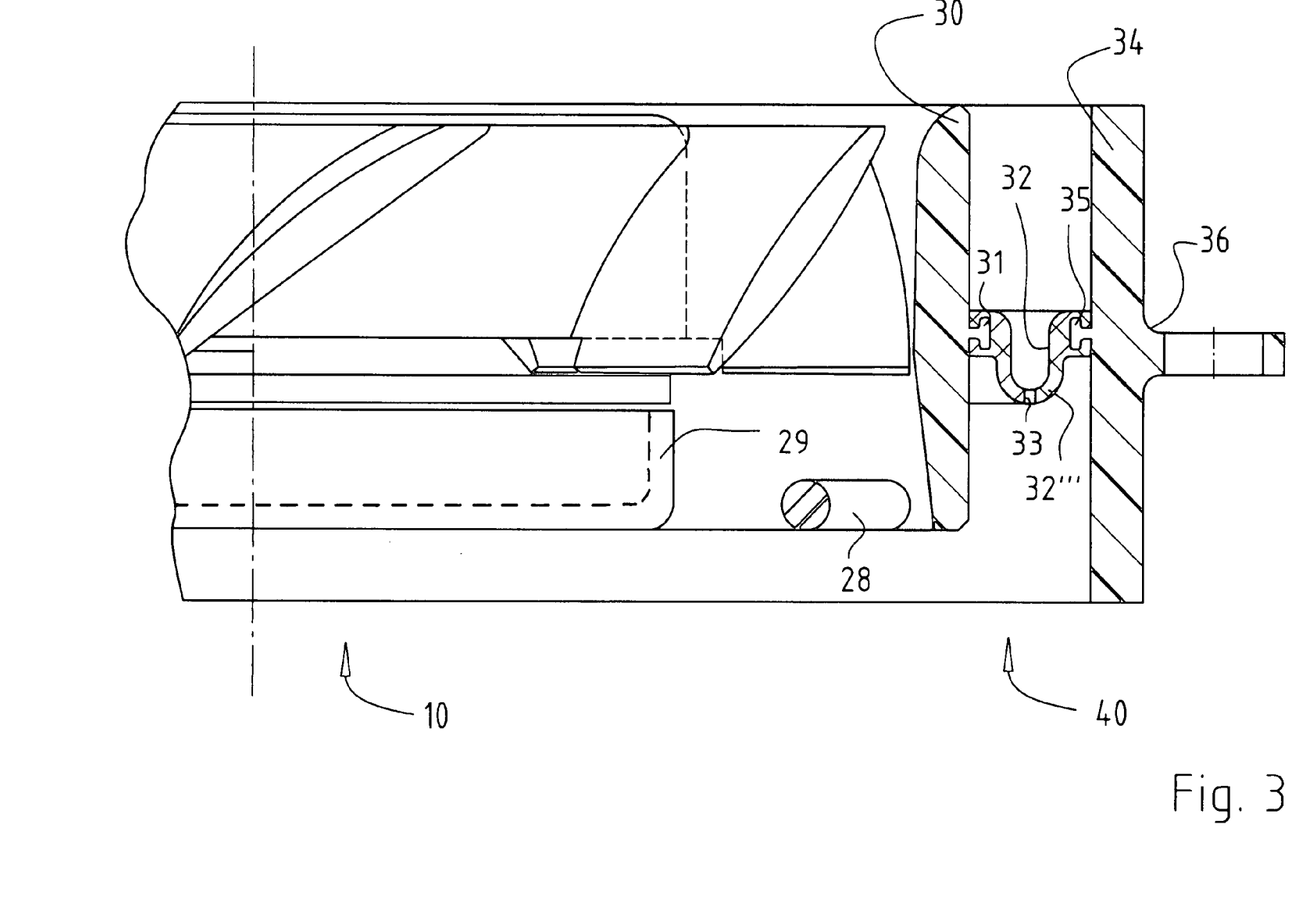
FIG. 3 shows a second exemplary embodiment of a fan arrangement according to the present invention, in a sectioned depiction analogous to FIG. 2.

FIG. 3 is a partially sectioned side view of a second exemplary embodiment of a fan arrangement 40 according to the invention, in a section corresponding to FIG. 1.

Membrane 32 is U-shaped in cross section in this exemplary embodiment, and the fan can therefore generate vibrations with larger vibration amplitudes. This is advantageous in particular for damping low-frequency vibrations.

Membrane 32 comprises one or more openings or apertures 33 at bulge 32'''. The vibration properties of membrane 32 are influenced by the absence of material (and therefore of mass) at this point.

Opening 33 furthermore has the advantage that, in applications in which the delivery side is closed off (for example, when a driver is sitting on a vehicle seat and all the outlet openings are covered), a so-called pneumatic short-circuit is prevented because air can flow back to the intake side through opening 33. As a result, fan 10 can continue to operate in a preferred working range. This aspect will preferably also be considered when selecting the exact configuration of openings 33.

Figure 4:
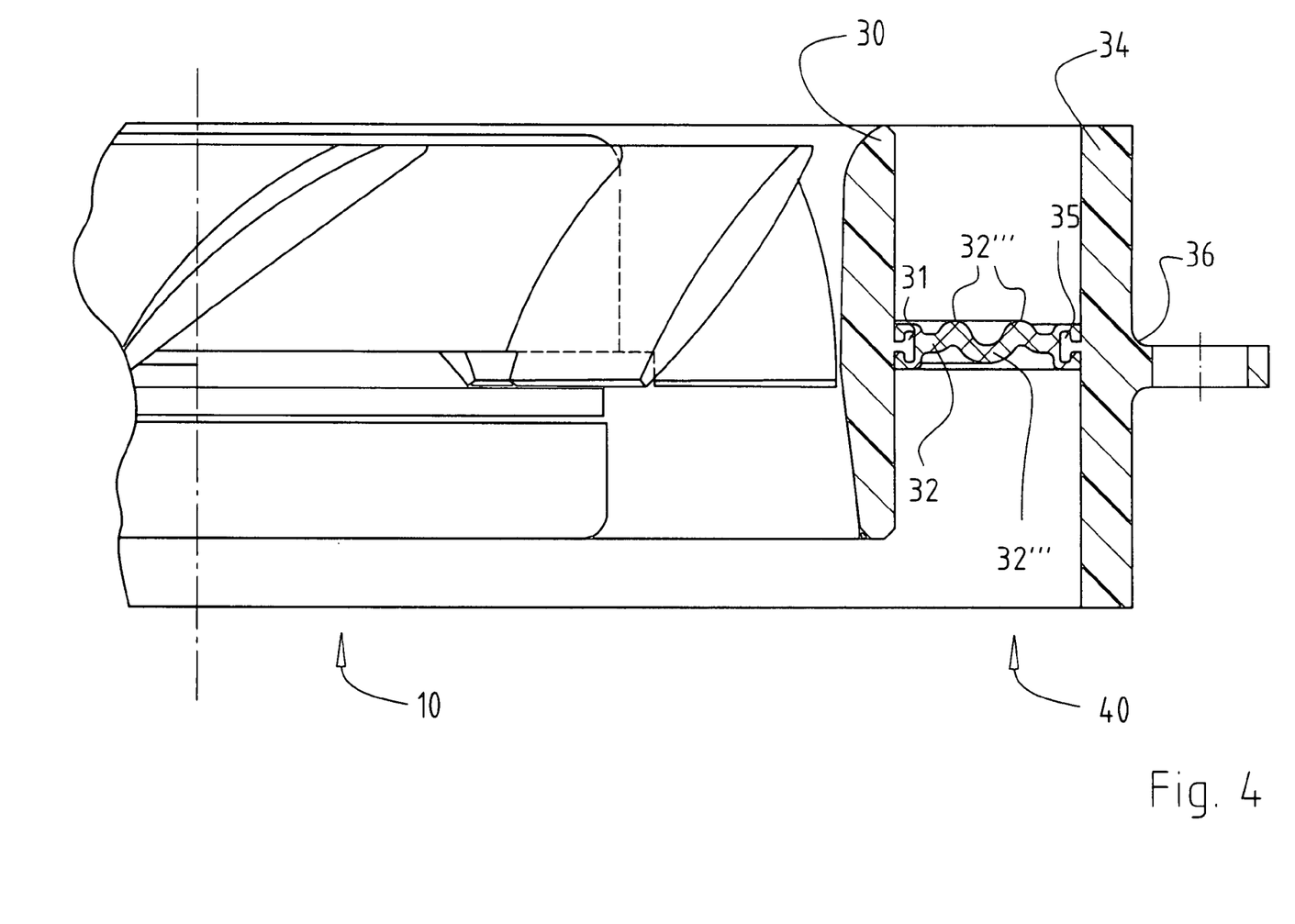
FIG. 4 is a section through a third exemplary embodiment of a fan arrangement according to the present invention having an undulating membrane, in a depiction analogous to FIGS. 2 and 3.

FIG. 4 is a partially sectioned side view of a third exemplary embodiment of a fan arrangement 40 according to the present invention, in a section corresponding to FIG. 1.

In this exemplary embodiment, membrane 32 of fan arrangement 40 is formed in an undulating or approximately sinusoidal shape, and has several bulges 32'''. Because of the greater length of membrane 32, fan 10 can perform larger movements or excursion in both the axial and radial directions.

In this exemplary embodiment, as in FIG. 3, it is also possible to create openings in membrane 32 in order to influence the damping properties.

Figure 5:
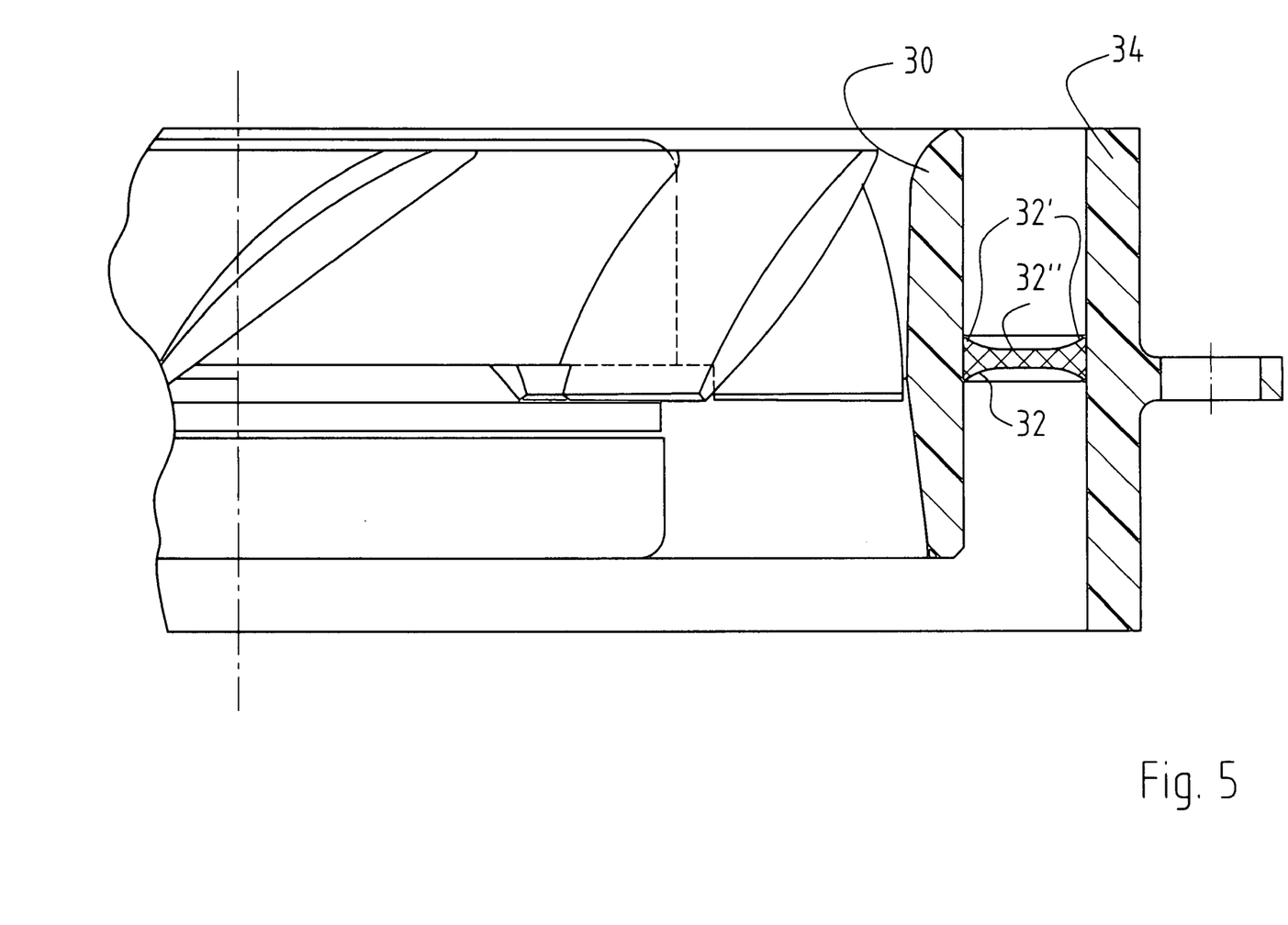
FIG. 5 is a section through a fourth exemplary embodiment of a fan arrangement according to the present invention having an adhesively mounted membrane.

FIG. 5 is a partially sectioned side view of a fourth exemplary embodiment of a fan arrangement 40 according to the present invention, in a section corresponding to FIG. 1.

Here a membrane 32 is adhesively connected to fan housing 30 and to mounting frame 34. In other words, no projections 31, 35 are present with which membrane 32 is positively connected. The material of membrane 32 must be suitable for such a connection, for example by entering into a chemical bond with the surfaces of the material of fan housing 30 and mounting frame 34.

Peripheral regions 32' of membrane 32 are made thicker in order to produce a larger surface area for connection.

Figure 6:
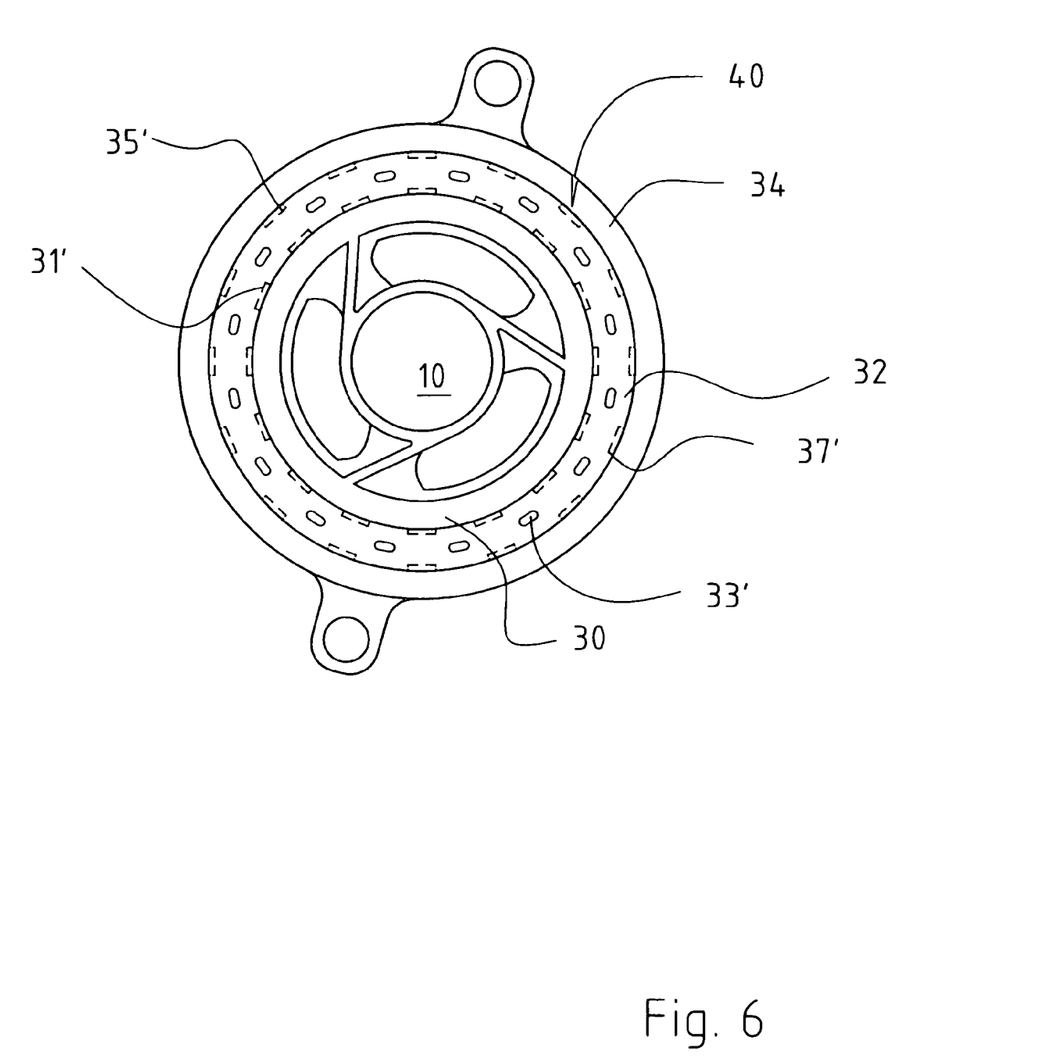
FIG. 6 is a plan view of a fifth exemplary embodiment of a fan arrangement according to the present invention having a membrane that is formed with oval elongated apertures.

FIG. 6 is a plan view of a fifth exemplary embodiment of a fan arrangement 40 according to the present invention.

Fan housing 30 and mounting frame 34 are connected via a membrane 32 that is equipped over the entire circumference with elongated holes 33' which have rounded ends 37', If a U-shaped or undulating membrane is used for diaphragm 32, holes 33' are then preferably located at an axially highest or lowest point (see FIG. 3).

In this exemplary embodiment, projections 31' and 35' are interrupted at regular intervals. If positive connection at the projections is not sufficient for secure retention of membrane 32, the latter is preferably additionally adhesively secured, at least at the locations without projections 31', 35'.

Figure 7:
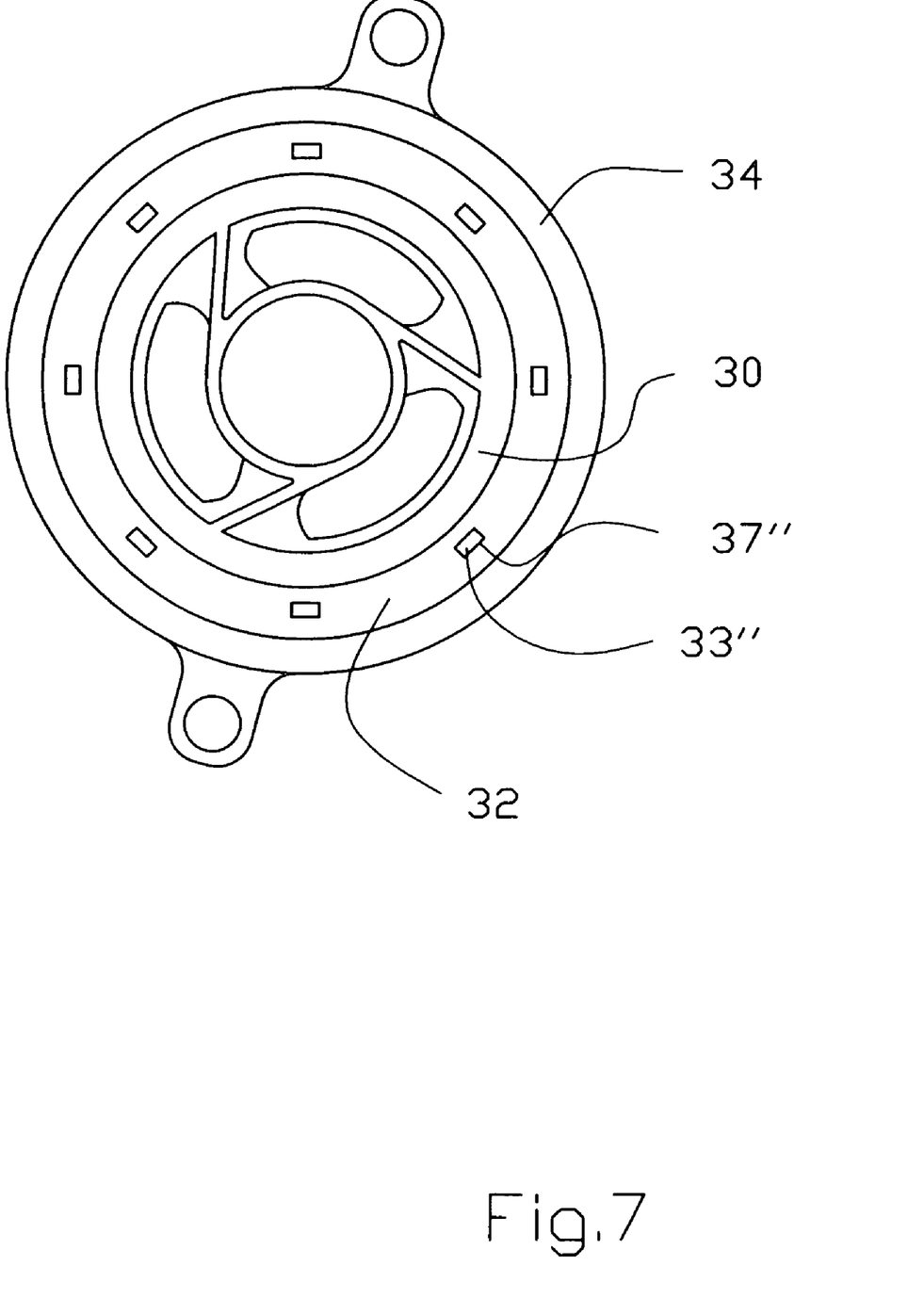
FIG. 7 is a plan view of a sixth exemplary embodiment of a fan arrangement according to the present invention having a membrane with angular elongated apertures.

FIG. 7 is a plan view of a sixth exemplary embodiment of a fan arrangement 40 according to the present invention.

Fan housing 30 and mounting frame 34 are connected via a membrane 32 that is equipped with angular elongated holes 33" which have substantially rectangular ends 37".

Many variations, modifications, and especially combinations are, of course, possible in the context of the present invention. In addition to round, oval, and rectangular shapes, holes 33 might also have triangular, polygonal, square, or other shapes. Good vibratory behavior in membrane 32 can be achieved for the particular motor type by selecting the shape and number of holes 33.

Projections 31 on fan housing 30 and projections 35 on mounting frame 34 can be differently configured, the shape of the projections can be varied, and the possible interruption of projections 31 and 35 around the circumference can be varied.

In order additionally to minimize vibration transfer, mounting frame 34 can likewise be mounted elastically on a component to be cooled.

Alternatively, a second membrane offset axially with respect to first membrane 32 can be provided in addition to the one membrane 32. This guarantees secure retention of fan 10 even when the forces occurring are large.

Method of Making

Figure 8:
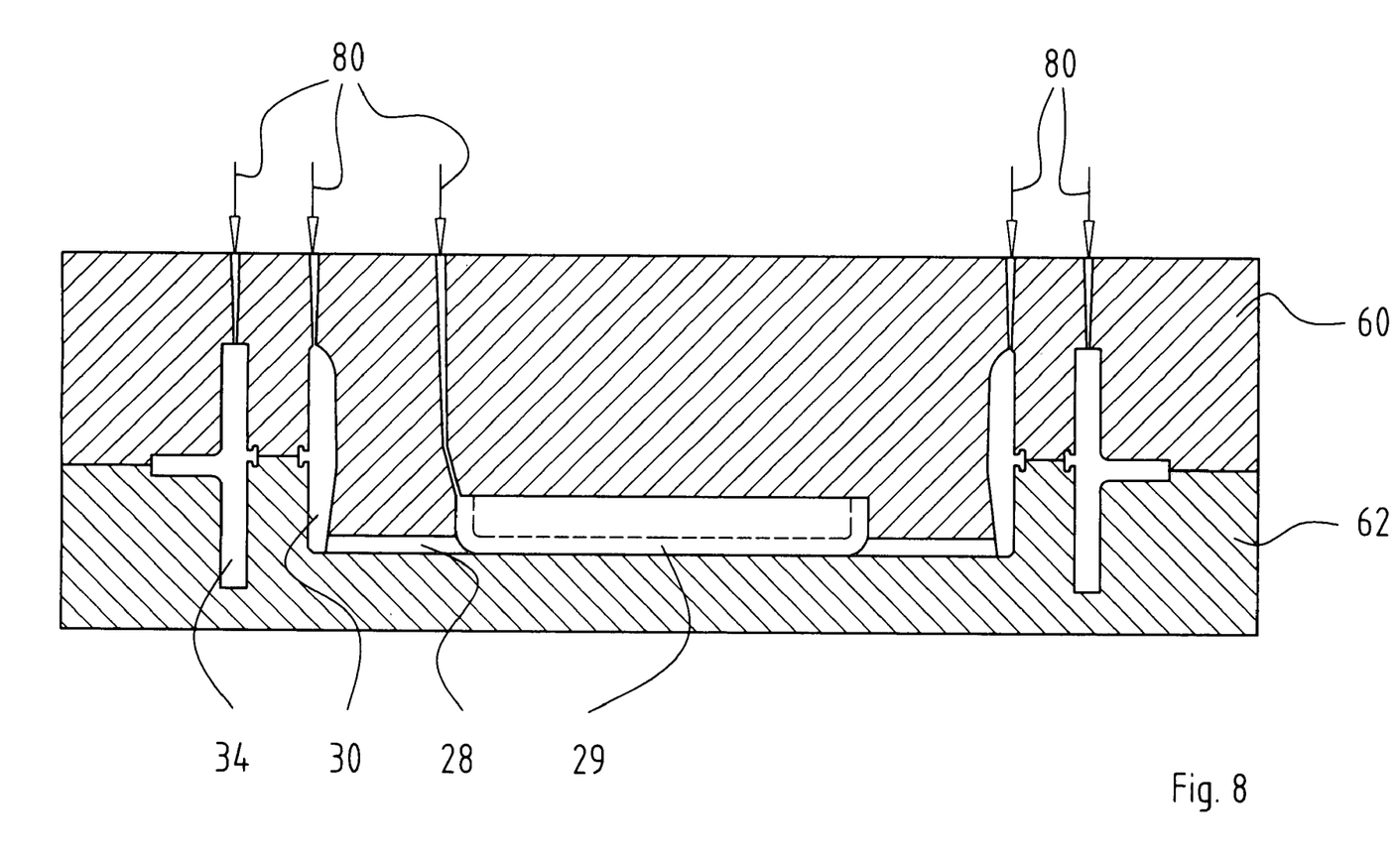
FIG. 8 schematically shows an upper injection mold and a lower injection mold for manufacturing a fan housing and a mounting frame.
Figure 9:
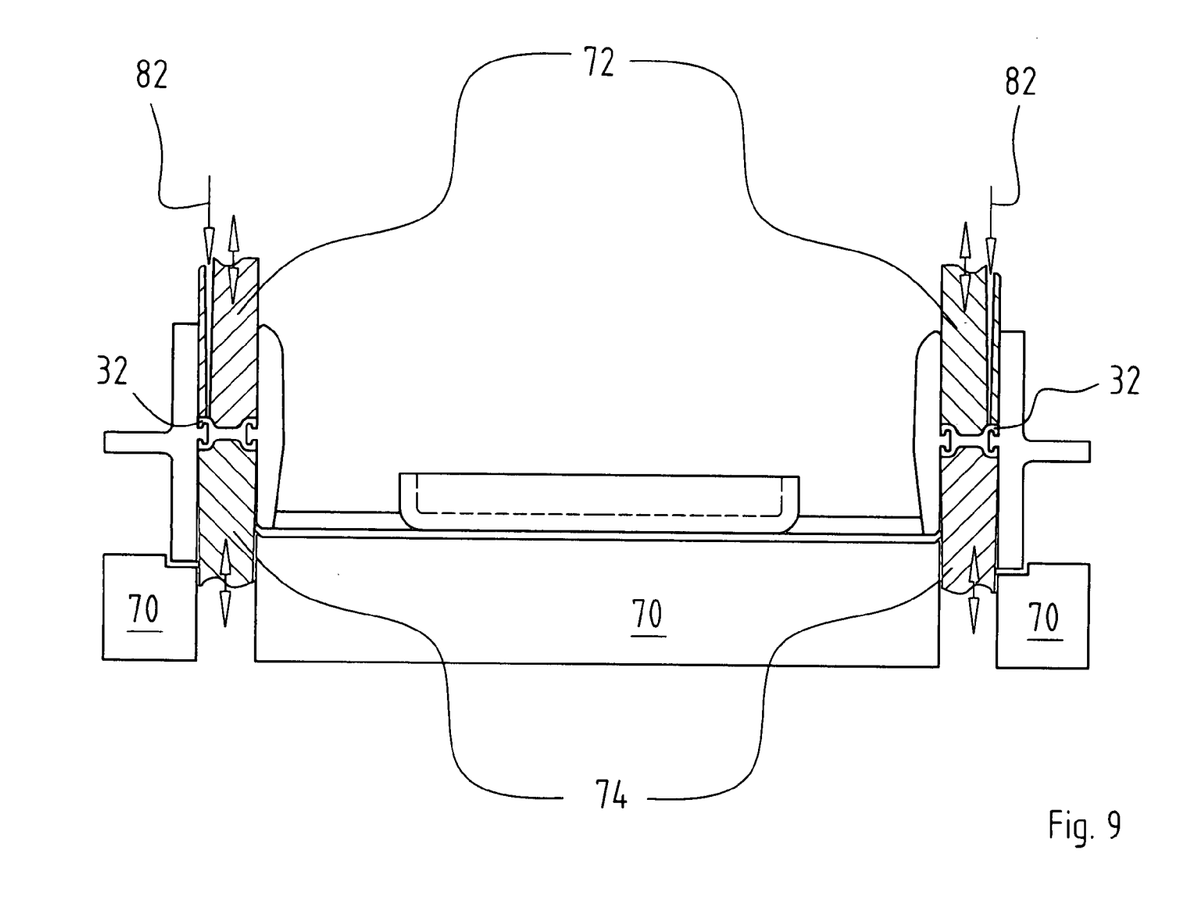
FIG. 9 schematically shows an apparatus having an upper mold part and a lower mold part for manufacturing a membrane.

FIG. 8 schematically shows an upper injection mold half 60 and a lower injection mold half 62, and FIG. 9 schematically shows a holding apparatus 70, an upper mold part 72, and a lower mold part 74. Upper mold parts 60 and 72 each have conduits 80 and 82, respectively, through which the material to be processed is fed.

A so-called 2-K technique, in which two plastics are processed, is used to manufacture holding apparatus 40. In this, fan housing 30 (optionally with struts 28 and motor retention flange 29) and mounting frame 34 are produced, for example using the injection-molding method, from a hard plastic by injection through conduits 80, and held in the correct position relative to one another (see FIG. 8).

The shape of membrane 32 is defined by way of two complementary mold parts 72, 74 protruding in from both axial sides as shown in FIG. 9, and membrane 32 is produced by injecting a soft elastomer. Fan 10 is then pressed into flange 29.

No threading-in or other laborious procedures are necessary here, and a positive connection to projections 31, 35 is immediately created.

Various changes and modifications are possible within the scope of the invention. Therefore, the invention is not limited to the specific embodiments shown and described, but rather is defined by the following claims.

What is claimed is:

1. A fan arrangement that comprises:
   a fan (10) that has a fan housing (30) within which is arranged a blower wheel (18) which, in operation, conveys air from an intake side of the fan (10) to a delivery side;
   a mounting frame (34) that is arranged radially outside the fan housing (30) and resiliently supports the fan arrangement (40);
   a membrane (32), made of an elastic material, which elastically connects the fan housing (30) and the mounting frame (34) to one another and is equipped with apertures (33) that, in the event of a closure of the delivery side of the fan arrangement (40), enable a return flow, from the delivery side to the intake side of the fan arrangement (40), of air conveyed by the blower wheel (18); and wherein
   the membrane (32) is connected to the fan housing (30) substantially over the latter's entire circumference.

2. The fan arrangement according to claim 1, wherein the membrane (32) is made from a plastic.

3. The fan arrangement according to claim 1, wherein the membrane (32) is made from an elastomer.

4. The fan arrangement according to claim 1, wherein the membrane (32) is implemented in the manner of a direct connection between the mounting frame (34) and the fan housing (30).

5. The fan arrangement according to claim 1, wherein the membrane (32) is positively connected to at least one of the fan housing (30) and the mounting frame (34).

6. The fan arrangement according to claim 1, wherein the membrane (32) is U-shaped when viewed in radial section.

7. The fan arrangement according to claim 1, wherein the membrane (32) is undulating in shape when viewed in radial section.

8. The fan arrangement according to claim 1, wherein the membrane (32), viewed in cross section, has at the location of its transition to the fan housing (30) a greater thickness and thus an enlarged connection cross section (32').

9. The fan arrangement according to claim 1, wherein the membrane (32), viewed in cross section, has at the location of its transition to the mounting frame (34) a greater thickness and thus an enlarged connection cross section (32').

10. The fan arrangement according to claim 9, wherein the membrane (32) has a reduced thickness in a region (32") between locations (32') of greater thickness.

11. The fan arrangement according to claim 1, wherein the membrane (32), viewed in cross section, has at least one bulge (32'''); and
    the apertures (33) are formed in a region adjacent the at least one bulge (32''').

12. The fan arrangement according to claim 1, wherein the apertures (33) are round in shape.

13. The fan arrangement according to claim 12, wherein the apertures (33) are substantially square in shape.

14. The fan arrangement according to claim 1, wherein the apertures (33) are rectangular in shape.

15. The fan arrangement according to claim 1, wherein the apertures (33) are formed as elongated apertures.

16. The fan arrangement according to claim 15, wherein the elongated apertures have substantially angular ends.

17. The fan arrangement according to claim 16, wherein the elongated apertures have substantially round ends.

18. The fan arrangement according to claim 1, wherein the fan housing (30) comprises at least one projection (31) and the membrane (32) encompasses the at least one projection (31).

19. The fan arrangement according to claim 1, wherein the mounting frame (34) compares at least one projection (35) and the membrane (32) encompasses the at least one projection (35).

20. The fan arrangement according to claim 19, wherein the at least one projection (35) extends around the entire circumference of the fan.

21. A method of manufacturing a fan arrangement (40) having a fan housing (30) and a mounting frame (34), comprising the steps of:
    a) bringing a first part (72) and a second part (74) of an injection mold into a circumferential space between the fan housing (30) and the surrounding mounting frame (34);
    b) injecting an elastomer between the first part (72) and the second part (74) of the injection mold in order to produce a membrane (32) that connects the fan housing (30) and the mounting frame (34).

22. The method according to claim 21, wherein the injection mold (72, 74) is shaped to produce a membrane (32) that is formed with apertures (33).

23. The method according to claim 21, wherein said injecting step comprises injection molding an elastomeric membrane dimensioned to span a radial gap between the fan housing (30) and a surrounding mounting frame (34).

24. A fan arrangement that comprises:
    a fan (10) that has a fan housing (30) within which is arranged a blower wheel (18) which, in operation, conveys air from an intake side of the fan (10) to a delivery side;
    a mounting frame (34) that is arranged radially outside the fan housing (30) and resiliently supports the fan arrangement (40);
    a membrane (32), made of an elastic material, which elastically connects the fan housing (30) and the mounting frame (34) to one another and is equipped with apertures (33) that, in the event of a closure of the delivery side of the fan arrangement (40), enable a return flow, from the delivery side to the intake side of the fan arrangement (40), of air conveyed by the blower wheel (18); and
    wherein the membrane (32) is connected to the mounting frame (34) substantially over the latter's entire inner circumference.

25. The fan arrangement according to claim 24, wherein the membrane (32) is made from a plastic.

26. The fan arrangement according to claim 24,
wherein the membrane (32) is made from an elastomer.

27. The fan arrangement according to claim 24,
wherein the membrane (32) is implemented in the manner of a direct connection between the mounting frame (34) and the fan housing (30).

28. The fan arrangement according to claim 24,
wherein the membrane (32) is positively connected to at least one of the fan housing (30) and the mounting frame (34).

29. The fan arrangement according to claim 24,
wherein the membrane (32) is U-shaped when viewed in radial section.

30. The fan arrangement according to claim 24,
wherein the membrane (32) is undulating in shape when viewed in radial section.

31. The fan arrangement according to claim 24,
wherein the membrane (32), viewed in cross section, has at the location of its transition to the fan housing (30) a greater thickness and thus an enlarged connection cross section (32').

32. The fan arrangement according to claim 24,
wherein the membrane (32), viewed in cross section, has at the location of its transition to the mounting frame (34) a greater thickness and thus an enlarged connection cross section (32').

33. The fan arrangement according to claim 32, wherein the membrane (32) has a reduced thickness in a region (32") between locations (32') of greater thickness.

34. The fan arrangement according to claim 24,
wherein the membrane (32), viewed in cross section, has at least one bulge (32'''); and
the apertures (33) are formed in a region adjacent the at least one bulge (32''').

35. The fan arrangement according to claim 24,
wherein the apertures (33) are round in shape.

36. The fan arrangement according to claim 24,
wherein the apertures (33) are rectangular in shape.

37. The fan arrangement according to claim 24,
wherein the apertures (33) are substantially square in shape.

38. The fan arrangement according to claim 24,
wherein the apertures (33) are formed as elongated apertures.

39. The fan arrangement according to claim 38,
wherein the elongated apertures have substantially angular ends.

40. The fan arrangement according to claim 38,
wherein the elongated apertures have substantially round ends.

41. A fan arrangement that comprises:
a fan (10) that has a fan housing (30) within which is arranged a blower wheel (18) which, in operation, conveys air from an intake side of the fan (10) to a delivery side;
a mounting frame (34) that is arranged radially outside the fan housing (30) and resiliently supports the fan arrangement (40);
a membrane (32), made of an elastic material, which elastically connects the fan housing (30) and the mounting frame (34) to one another and is equipped with apertures (33) that, in the event of a closure of the delivery side of the fan arrangement (40), enable a return flow, from the delivery side to the intake side of the fan arrangement (40), of air conveyed by the blower wheel (18); and
wherein the membrane (32) is adhesively connected to at least one of the fan housing (30) and the mounting frame (34).

42. The fan arrangement according to claim 41,
wherein the membrane (32) is made from a plastic.

43. The fan arrangement according to claim 41,
wherein the membrane (32) is made from an elastomer.

44. The fan arrangement according to claim 41,
wherein the membrane (32) is implemented in the manner of a direct connection between the mounting frame (34) and the fan housing (30).

45. The fan arrangement according to claim 41,
wherein the membrane (32) is positively connected to at least one of the fan housing (30) and the mounting frame (34).

46. The fan arrangement according to claim 41,
wherein the membrane (32) is U-shaped when viewed in radial section.

47. The fan arrangement according to claim 41,
wherein the membrane (32) is undulating in shape when viewed in radial section.

48. The fan arrangement according to claim 41,
wherein the membrane (32), viewed in cross section, has at the location of its transition to the fan housing (30) a greater thickness and thus an enlarged connection cross section (32').

49. The fan arrangement according to claim 41,
wherein the membrane (32), viewed in cross section, has at the location of its transition to the mounting frame (34) a greater thickness and thus an enlarged connection cross section (32').

50. The fan arrangement according to claim 49, wherein the membrane (32) has a reduced thickness in a region (32") between locations (32') of greater thickness.

51. The fan arrangement according to claim 41,
wherein the membrane (32), viewed in cross section, has at least one bulge (32'''); and
the apertures (33) are formed in a region adjacent the at least one bulge (32''').

52. The fan arrangement according to claim 41,
wherein the apertures (33) are round in shape.

53. The fan arrangement according to claim 41,
wherein the apertures (33) are rectangular in shape.

54. The fan arrangement according to claim 41,
wherein the apertures (33) are substantially square in shape.

55. The fan arrangement according to claim 41,
wherein the apertures (33) are formed as elongated apertures.

56. The fan arrangement according to claim 55,
wherein the elongated apertures have substantially angular ends.

57. The fan arrangement according to claim 56,
wherein the elongated apertures have substantially round ends.

* * * * *